J. Wehle.
Conformator.

No. 25,154.   Patented Aug. 16. 1859.

Witnesses:
Charles Wehle
John Browney

Julius Wehle

UNITED STATES PATENT OFFICE.

JULIUS WEHLE, OF NEW YORK, N. Y.

HAT-MEASURE.

Specification of Letters Patent No. 25,154, dated August 16, 1859.

*To all whom it may concern:*

Be it known that I, JULIUS WEHLE, of the city, county, and State of New York, have invented new and useful Improvements in Hat-Measures; and I do hereby declare that the following is a full and exact description thereof, reference being had to the annexed drawings, making part of this specification, in which—

Figure 1:
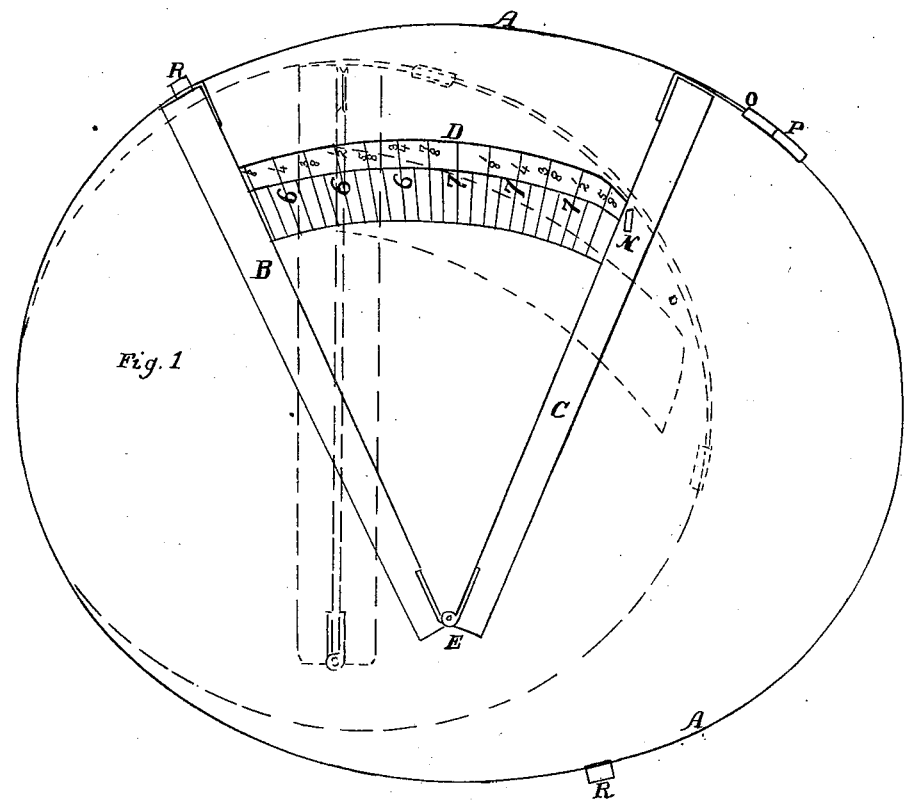
Figure 2:
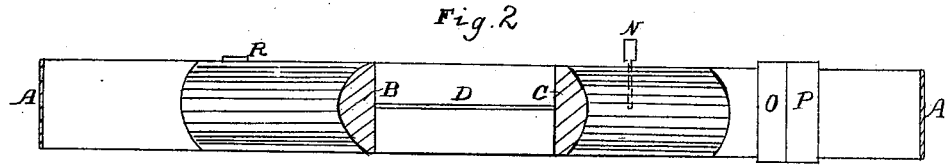

Figure 1, is a horizontal view, Fig. 2, a vertical section of my improved hat measure.

Similar letters of reference indicate corresponding parts in these figures.

The nature of my invention consists in making a hat measure with internal double handles, and a scale parallel with the circumference of the said hat measure and fastened to the said handles as hereinafter described.

To enable others, skilled in the art, to make and use my invention, I will proceed to describe its construction and operation.

My hat measure consists of piece of plate metal A bent to an oval shape as shown by the black lines of Fig. 1. The two ends of the oval are fastened to two rings O and P and are made to overlap in such a manner that the circumference of the measure may be made to decrease by drawing the ends of the metal farther through the two rings; as shown by the red lines of Fig. 1. Two handles B and C are fastened with one of their ends to the oval plate A in such a manner that by drawing the said ends together the circumference of the measure is shortened. The other ends of the two handles are hinged at E. The metal plate A being made elastic or consisting of a spring, it is evident that by the pressing the two handles together the oval ring A will be drawn together and its circumference will be lessened; and by releasing the pressure the oval ring A will expand to its former size.

A scale D is secured to one of the handles B, and passes through a corresponding slot of the other handle. This scale is parallel with the circumference of the measure or ring and contains the usual graduation of the hat measure. The screw N of the handle C is so placed, that the scale D may be fastened in the slot of the handle C at any desired point of the scale.

R, R are two small horizontal plates projecting beyond the circumference of the oval ring and are secured to the said ring for the purpose of sustaining the same in its position in the hat and of preventing the sliding of the measure into the hat farther than may be desired.

This hat measure is applied in the following manner. By the pressure of the hand the two handles B and C are drawn together, and thereby the circumference of the ring A is so decreased, (as shown by the red lines) that it may be placed in the inside of the hat; the pressure of the handles is then released, thereby causing an expansion of the ring to the internal circumference of the hat; care being taken to rest the projecting plates R R on the outside rim of the hat. The screw N is now turned, so as to fasten the handle C to the scale D, and the whole instrument may now be removed from the hat, and the measure of the same may be read on the scale. This measure can also be applied to caps.

Having thus described my invention and the manner of using the same, what I claim as new and desire to secure by Letters Patent is:

1. The divided handle in combination with the elastic oval strip A for the purpose of contracting the said oval strip substantially as described.

2. The scale D secured to one of the handles and passing through an incision of the other handle in combination with the screw N substantially as described for the purpose set forth.

Dated at New York June 1, 1859.

JULIUS WEHLE.

Witnesses:
CHARLES WEHLE,
JOHN BROWNEY.